UNITED STATES PATENT OFFICE.

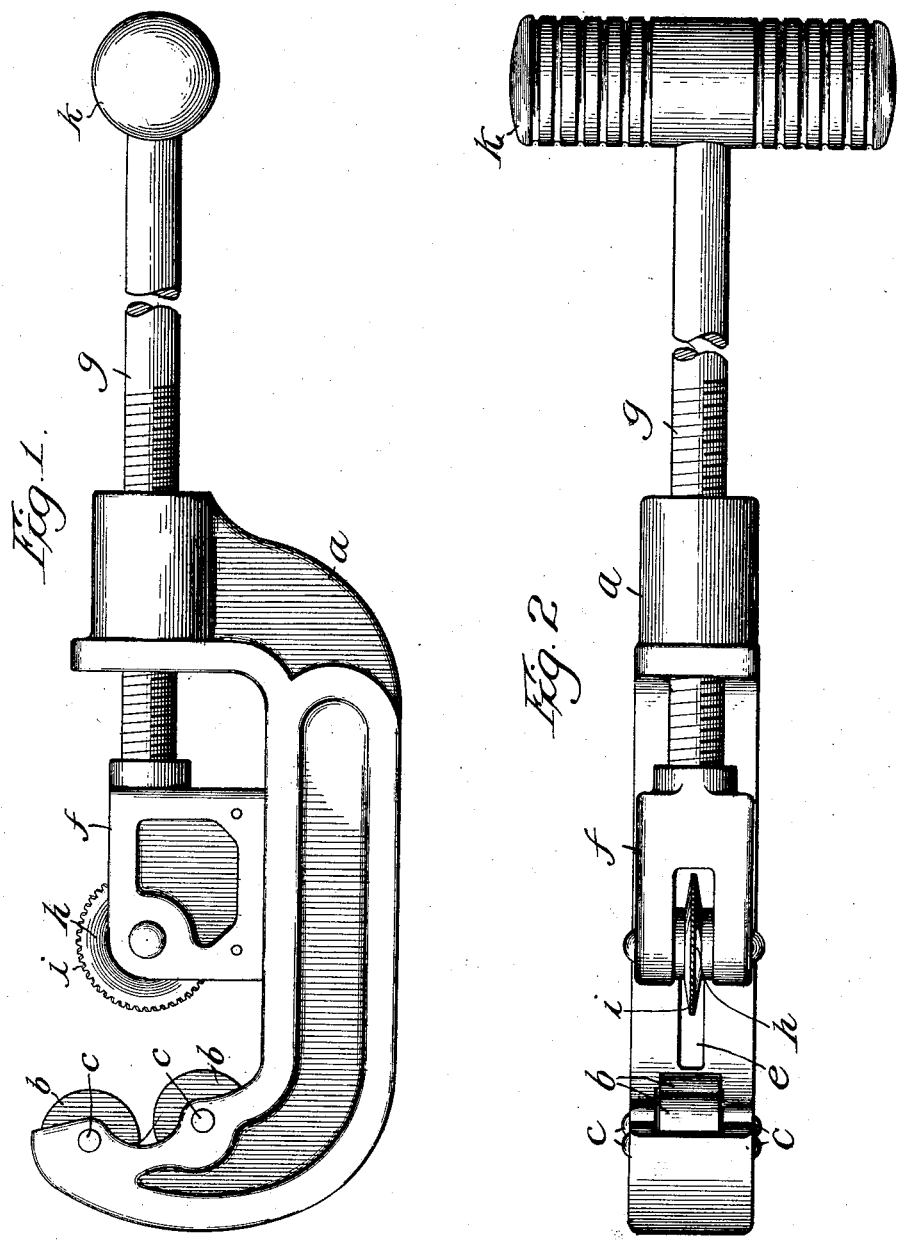

EDWARD E. BECK, OF CHICAGO, ILLINOIS, ASSIGNOR TO CROWN DIE & TOOL COMPANY, OF CHICAGO, ILLINOIS, A CORPORATION OF ILLINOIS.

CUTTING IMPLEMENT.

1,077,951. Specification of Letters Patent. Patented Nov. 4, 1913.

Application filed January 13, 1910, Serial No. 537,851. Renewed September 22, 1913. Serial No. 791,248.

*To all whom it may concern:*

Be it known that I, EDWARD E. BECK, a subject of King Frederick the Eighth of Denmark, residing at Chicago, in the county of Cook and State of Illinois, have invented certain new and useful Improvements in Cutting Implements, of which the following is a full, clear, concise, and exact description, reference being had to the accompanying drawings, forming a part of this specification.

This invention relates to improvements in cutting implements heretofore provided with a circular knife-like cutting blade surrounding and projecting beyond the periphery of a rotatable wheel for severing a pipe or tube by cutting into and thereby forcing their metal apart until severed, and also to those implements in which the forcing apart of the pipe or tube by the cutting edge is followed by a serrated cutting surface at each side thereof for removing the burs produced by the forcing apart cutting action by the cutting blade, and in which if the cutting edge were removed there would be an objectionable waste of the pipe.

Cutter wheels having knife-like cutting edges either with or without being followed by serrated cutting surfaces not only require an objectionable degree of force for severing a pipe, but are not well adapted for many kinds of pipe of recent manufacture, having as they do, a very tough skin encompassing them, because of the resistance of this skin to severing action of a knife-like edge, and which therefore, makes it both desirable and necessary for obtaining the best results that a form of severing edge be employed not producing burs nor severing either the skin or pipe by a knife-like cutting action.

The prime object of this invention is to provide a cutting implement with a severing edge so formed that it will sever both the skin and the pipe entirely by a crushing, as distinguished from a cutting action without any substantial waste of the pipe and by the use of a force substantially less than that required by any other form of pipe severing.

A further object of this invention is a pipe severing wheel, the edge of which is so formed in its entirety that it shall be of maximum durability in its use in the severing of a pipe.

With these ends in view, my invention finds embodiment in certain features of novelty in the construction, combination and arrangement of parts by which the said objects and certain other objects are hereinafter attained, all as fully described with reference to the accompanying drawing, and more particularly pointed out in the claims.

In the accompanying drawing: Figure 1 illustrates in side view a cutting implement in which my invention finds embodiment, and Fig. 2 is a face view thereof.

Similar characters of reference indicate the same parts in the figures of the drawing.

The pipe cutting implement, as shown is the preferred embodiment of the invention, includes a cutter holder frame, *a*, that partially houses two rollers *b—b*, that are journaled in said frame at *c—c*.

The frame is provided with a longitudinally disposed groove *e*, that serves to receive a portion of a reciprocable block *f*, whereby said block may be guided in movements toward and from the rollers *b—b* that are effected by means of the rotation of a hand rod *g*, in threaded connection with the frame *a*, and having such union with the block *f*, as to force movement of said block in either direction longitudinally of the frame *a*, without causing said block to be turned.

A cutter wheel, *h*, is journaled in the block *f*, is freely rotatable therein, and its entire cutting edge of serrated formation *i*, which may or may not, as desired or necessary, extend entirely transversely across the periphery of the wheel depending upon the thickness of the wheel and the width of the cut it is desired to make in severing a pipe or tube. The wheel *h*, is preferably lenticular in form, so that its diverging sides may coöperate with its serrated edge in forcing the metal of the pipe away from the wheel and prevent the serrated edge from becoming wedged in the pipe. In this connection it may also be observed that the serrations of the edge preferably extend diagonal to the axis, as distinguished from longitudinally with the axis of the wheel for the purpose of quickening and reducing the force otherwise required to force the metal of the pipe laterally away from the wheel.

In operation the implement is placed in its operative position upon the pipe, the handle $k$ is then turned until the pipe to be cut is engaged by the rollers $b$—$b$, and the cutter wheel is in forcible contact with the pipe, whereupon the implement is turned by the handle with the result that the serrated cutting portion $i$, first crushes and thereby removes the hard and brittle outer skin, the further turning of the implement operating to crush the pipe until unlike the skin the pipe is forced apart without removing any of the metal particles of which it is composed. In other words the form in cross-section of the wheel, and the diagonal inwardly tapering cuts, together define a series of almost interlapping sharp-edged teeth, each tapering from all sides and effecting an entering cut, and crush, which deepens and widens until the series becomes a continuous kerf. In short, the serrated, tapering cutting edge removes the tough skin surrounding the pipe and severs the pipe without removing any of its metal, and for so doing requires the use of substantially less applied force than is necessary for severing pipes when they are cut into by a knife-like cutting blade, and furthermore it is found in practice that a serrated cutting edge operates much longer before becoming dull and requires little, or no sharpening as compared with a knife-like cutting edge when used upon pipes of the same degree of hardness and temper of metal.

While the rollers $b$—$b$ are shown of cylindrical form, I do not wish to be limited to rollers of cylindrical form. As illustrated, said rollers do not cut into the piping, but I do not wish to be limited to rollers that do not cut into the piping.

In the claims, I use the term rollers in the broad sense of rotating bodies and with the intention of including structures that are disk formed as well as of cylindrical form, and other forms as well.

Having described my invention, what I claim and desire to secure by Letters Patent is:

1. A pipe cutting implement comprising in combination a cutter holder, a jaw therein providing a pipe retaining surface, and a rotatable cutter wheel mounted in the holder opposing said surface, the entire severing edge of which wheel consists of a beveled portion having serrations disposed diagonally of the axis of the wheel, whereby a pipe and its skin may be severed by a crushing action without removing substantially any of the metal of the pipe, substantially as described.

2. A pipe cutting implement comprising in combination a cutter holder having a pipe sustaining surface, and a rotatable cutter wheel lenticular in form with its sides converging to an edge, provided with diagonal serrations whereby said sides coöperate with the serrations in severing the skin and body of a pipe by a crushing as distinguished from a cutting action, substantially as described.

3. A pipe cutting implement comprising in combination a cutter holder provided with a shifting pipe retaining surface, and a rotatable lenticular cutter adjustably supported in the holder, the sides of which cutter converge to a serrated edge, the edges of the serrations being disposed at an oblique angle thereto, substantially as and for the purpose described.

In witness whereof, I hereunto subscribe my name this 8th day of January A. D. 1910.

EDWARD E. BECK.

Witnesses:
C. L. CRAGG,
R. E. ATHERTON.